(12) United States Patent
Gibson et al.

(10) Patent No.: US 11,479,678 B1
(45) Date of Patent: Oct. 25, 2022

(54) REFLECTIVE PAINT FOR CRYOGENIC APPLICATIONS

(71) Applicant: United States of America as Represented by the Administrator of NASA, Washington, DC (US)

(72) Inventors: Tracy L. Gibson, Melbourne, FL (US); Robert C. Youngquist, Cocoa, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 499 days.

(21) Appl. No.: 16/575,720

(22) Filed: Sep. 19, 2019

Related U.S. Application Data

(60) Provisional application No. 62/740,597, filed on Oct. 3, 2018.

(51) Int. Cl.
| | |
|---|---|
| *C09D 5/33* | (2006.01) |
| *C09D 7/61* | (2018.01) |
| *C09D 7/40* | (2018.01) |
| *C08K 3/01* | (2018.01) |
| *C08K 3/22* | (2006.01) |

(Continued)

(52) U.S. Cl.
CPC ............ *C09D 5/004* (2013.01); *C08K 3/01* (2018.01); *C08K 3/16* (2013.01); *C08K 3/22* (2013.01); *C09D 1/00* (2013.01); *C09D 7/20* (2018.01); *C09D 7/61* (2018.01); *C09D 7/68* (2018.01); *C04B 35/50* (2013.01); *C04B 2235/3224* (2013.01); *C04B 2235/3225* (2013.01); *C04B 2235/444* (2013.01); *C08K 2003/221* (2013.01)

(58) Field of Classification Search
None
See application file for complete search history.

(56) References Cited

U.S. PATENT DOCUMENTS

| | | |
|---|---|---|
| 4,828,354 A | 5/1989 | Yoshida |
| 5,658,504 A | 8/1997 | Shibata et al. |

(Continued)

OTHER PUBLICATIONS

Yougquist et al., Cryogenic Selective Surfaces, NIAC Phase II study final report, published Sep. 2018 (Year: 2018).*

(Continued)

*Primary Examiner* — Coris Fung
*Assistant Examiner* — Keling Zhang
(74) *Attorney, Agent, or Firm* — Jonathan J. Leahy; Mark Homer

(57) ABSTRACT

A reflective paint's liquid mixture includes 42.4-71.3 weight percent of a liquid solvent, 14.4-28.3 weight percent of a binder fully dissolved in the liquid solvent, and 13.8-29.3 weight percent of light scattering particles that are insoluble in the liquid solvent and are of a size ranging from 100 nanometers to 200 nanometers. The binder is selected from potassium bromide, sodium chloride, potassium chloride, sodium bromide, cesium chloride, and rubidium chloride. The light scattering particles are selected from hafnium oxide and yttrium oxide. The reflective paint is particularly useful as a surface coating for a variety of structures that must support cryogenic temperatures. It can be used in any application to act as a broadband reflector of the Sun's radiation in the wavelength band from approximately 0.21 microns to 9 microns and beyond.

20 Claims, 4 Drawing Sheets

(51) Int. Cl.
  *C08K 3/16* (2006.01)
  *C09D 7/20* (2018.01)
  *C09D 1/00* (2006.01)
  *C04B 35/50* (2006.01)

(56) References Cited

U.S. PATENT DOCUMENTS

| | | |
|---|---|---|
| 8,749,881 B2 | 6/2014 | Banerjee et al. |
| 9,254,089 B2 | 2/2016 | Tearney et al. |
| 9,715,047 B2 | 7/2017 | Banerjee et al. |
| 10,273,024 B1 | 4/2019 | Youngquist et al. |
| 2008/0204861 A1 | 8/2008 | Shiraishi |
| 2009/0153953 A1 | 6/2009 | Banerjee et al. |
| 2011/0091658 A1 | 4/2011 | Banerjee et al. |
| 2011/0128616 A1 | 6/2011 | Banerjee et al. |
| 2011/0134515 A1 | 6/2011 | Banerjee et al. |
| 2013/0026371 A1 | 1/2013 | Holloway et al. |
| 2013/0320220 A1 | 12/2013 | Donowsky |
| 2014/0060643 A1 | 3/2014 | Martin et al. |
| 2014/0226197 A1 | 8/2014 | Natsumeda et al. |
| 2015/0033988 A1 | 2/2015 | Wu |
| 2015/0103398 A1 | 4/2015 | Banerjee et al. |
| 2015/0369928 A1 | 12/2015 | Reese et al. |
| 2016/0176223 A1 | 6/2016 | Degott et al. |
| 2017/0248746 A1 | 8/2017 | Banerjee et al. |
| 2017/0253070 A1 | 9/2017 | Loginov et al. |
| 2018/0045865 A1 | 2/2018 | Banerjee et al. |
| 2018/0111406 A1 | 4/2018 | Loginov et al. |

OTHER PUBLICATIONS

Youngquist et al., "Achieving cryogenic temperatures in deep space using a novel coating," Optics Letters 41, No. 6 (2016): 1086-1089.
Youngquist et al., "Cryogenic Selective Surfaces," Final Report on a Phase I NIAC Study, (2016) 1-63.

* cited by examiner

REFLECTIVE PAINT FOR CRYOGENIC APPLICATIONS

Pursuant to 35 U.S.C. § 119, this patent application claims the benefit of priority to U.S. Provisional Patent Application Ser. No. 62/740,597, filed Oct. 3, 2018, the contents of which are hereby incorporated by reference in their entirety.

ORIGIN OF THE INVENTION

The invention described herein was made in the performance of work under a NASA contract and by employees of the United States Government and is subject to the provisions of Public Law 96-517 (35 U.S.C. § 202), and may be manufactured and used by or for the Government for governmental purposes without the payment of any royalties thereon or therefore.

BACKGROUND OF THE INVENTION

This invention relates to reflective coatings. More specifically, the invention is a reflective paint that can be applied to surfaces for the preservation of cryogenic temperatures for objects in space to thereby reduce or eliminate the need for active cooling.

There are many temperature-related challenges involved in deep-space exploration, but several of these can be mitigated, or even solved, by the development of a coating that reflects most of the Sun's energy, yet still provides far-infrared heat emission. Such a coating would allow non-heat-generating objects in space to reach cryogenic temperatures without using an active cooling system. This would benefit deep-space sensors that require low temperatures, such as the James Webb Telescope focal plane array. It would also allow the use of superconductors in deep space, which could enable technologies such as magnetic energy storage rings; lossless power delivery; or large-volume magnetic shields for protection of space structures against galactic cosmic radiation. However, perhaps the most significant enablement achieved from such a coating would be the long-term, deep space storage of cryogenic liquids, such as liquid oxygen (LOX).

Selective surfaces, also known as thermal control coatings, are often used in spacecraft applications to minimize the absorption of solar radiation, yet allow infrared (IR) energy to be emitted. These coatings allow the emission of waste heat while minimizing the solar heat load thereby providing thermal control of spacecraft. The best currently-available solar reflectors absorb 6% of the Sun's power in the 250 nanometer (nm) to 2500 nm range and absorb additional solar power at wavelengths longer than 2500 nm. Therefore, state-of-the-art solar reflectors likely absorb more than 100 watts per meter squared ($W/m^2$) of the Sun's irradiant power, while emitting roughly 400 $W/m^2$ when at 300° Kelvin (K). This allows a net energy loss providing cooling to a spacecraft. However, if a plate were covered with this solar reflector and turned to face the Sun, it would come to an equilibrium temperature of about 200° K assuming no heat flowed out of the back of the plate. While 200° K is a cold temperature, it is not cold enough to allow storage of cryogens or to permit operation of superconductors.

SUMMARY OF THE INVENTION

Accordingly, it is an object of the present invention to provide a reflective coating/surface for cryogenic applications.

Another object of the present invention is to provide a reflective paint that can readily be applied to a variety of structures.

Other objects and advantages of the present invention will become more obvious hereinafter in the specification and drawings.

In accordance with the present invention, a reflective paint is a liquid mixture that includes 42.4-71.3 weight percent of a liquid solvent, 14.4-28.3 weight percent of a binder fully dissolved in the liquid solvent, and 13.8-29.3 weight percent of light scattering particles that are insoluble in the liquid solvent and are of a size ranging from 100 nanometers to 200 nanometers.

The binder is selected from the group of materials consisting of potassium bromide, sodium chloride, potassium chloride, sodium bromide, cesium chloride, and rubidium chloride. The light scattering particles are selected from the group of materials consisting of hafnium oxide and yttrium oxide.

BRIEF DESCRIPTION OF THE DRAWINGS

Other objects, features, and advantages of the present invention will become apparent upon reference to the following description of the preferred embodiments and to the drawings, wherein corresponding reference characters indicate corresponding parts throughout the several views of the drawings and wherein.

DESCRIPTION OF THE INVENTION

Figure 1:
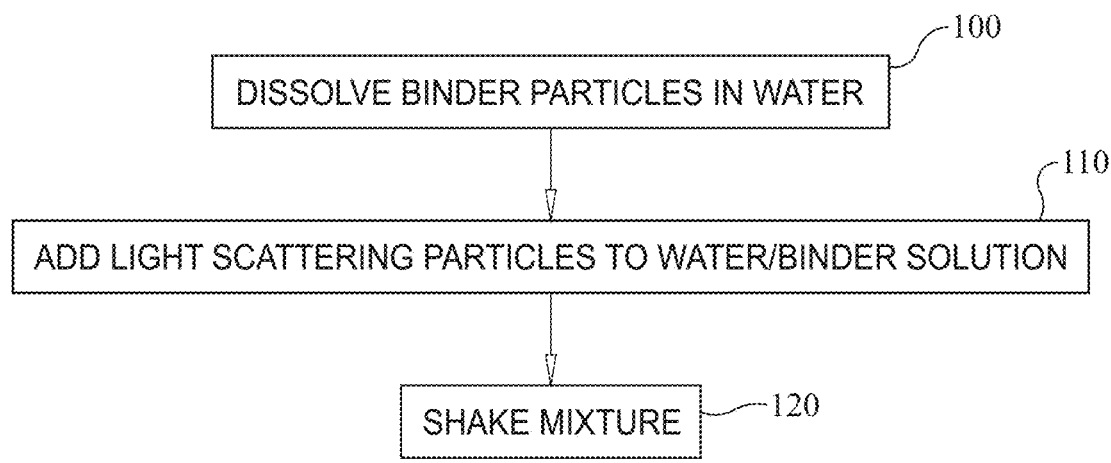
FIG. 1 is a process flow diagram for fabricating a reflective paint in accordance with an embodiment of the present invention.

The present invention is a reflective paint that is particularly useful as a surface coating for a variety of structures that must support cryogenic temperatures. For example, the reflective paint of the present invention can be used on a variety of structures and systems used in space that are dependent upon maintenance of very cold (i.e., cryogenic) temperatures for system operation and/or the structure's contents. Further, the reflective paint of the present invention could be used to reduce or eliminate the need to employ active cooling systems onboard space systems and structures. However, it is to be understood that the reflective paint of the present invention is not limited to in-space applications as the reflective paint can be used in any application to act as a broadband reflector of the Sun's radiation in the wavelength band from approximately 0.21 microns to 9 microns and beyond.

The reflective paint formulation of the present invention has several variations depending on the application to include the type of surface to which the paint will be applied. At its most basic formulation, the reflective paint combines the following three ingredients: a single liquid solvent, binder particles, and light scattering particles. For some substrate surface materials, a second liquid solvent can be added to improve adherence of the reflective paint and/or prevent reaction/corrosion between the reflective paint and the underlying substrate surface material. The basic paint formulation using one liquid solvent as well as two additional paint formulations adding a second liquid solvent are presented in the table below.

Paint Formulations

| Solvent A | Solvent B | Solvent A Weight % | Solvent B Weight % | Binder Weight % | Scatterer Weight % |
| --- | --- | --- | --- | --- | --- |
| Water | N/A | 42.4-71.3 | N/A | 14.4-28.3 | 14.3-29.3 |
| Water | Methanol | 44.1-48.0 | 14.7-16.0 | 16.5-18.1 | 17.9-24.7 |
| Water | Ethanol | 45.4-51.7 | 15.1-17.2 | 15.2-17.3 | 13.8-24.2 |

For each of the three formulations noted in the table, the water solvent is purified water such as what is known as "nanopure water" that is defined as having an ionic purity of at least 18.2 megohms. A variety of commercially-available lab water systems can be used to generate such purified water as is well-known in the art.

The binder materials for each of the three formulations are particles prior to the fabrication process. However, the binder materials must be completely soluble in any of the water, water/methanol, or water/ethanol liquid solvents; remain completely dissolved during paint fabrication as will be described further below; and remain completely dissolved in the final paint's liquid mixture throughout application of the paint to a surface. While the size of the binder particles is not a limitation of the present invention, smaller sizes will hasten their dissolution in water during the paint fabrication process. The binder material must be transmissive or non-absorptive with respect to a significant portion of the radiation within the Sun's spectral emission band. The binder material must also be completely soluble in any of the paint's liquid solvents as noted above. Suitable binder materials include potassium bromide, sodium chloride, potassium chloride, sodium bromide, cesium chloride, and rubidium chloride. Regardless of the choice of binder material, it is preferred that it be at least 99.9% pure.

The scatterer materials for each of the three formulations are particles of light scattering material that are insoluble in any of the paint's liquid solvents and whose particle size generally ranges from 100 to 200 nanometers (nm). The light scattering material must also have a substantially different (and typically greater) index of refraction than the binder material. Suitable light scattering materials include hafnium oxide and yttrium oxide. Regardless of the choice of light scattering material, it is preferred that it be at least 99.9% pure.

For each of the three paint formulations recited in the table above, reflectance performance varies with the weight percent of the ingredients. In general, the various paint mixtures of the present invention will employ approximately the same weight percent of binder particles and light scattering particles. However, it is to be understood that slight variations can be tolerated without affecting paint performance.

Based on empirical and analytic data, a suitable paint formulation for the water-only solvent is approximately 60.8 weight percent water, approximately 19.7 weight percent binder particles, and approximately 19.5 weight percent light scattering particles. For the two-part solvent of water and methanol, a suitable formulation is approximately 48.0 weight percent water, approximately 16.0 weight percent methanol, approximately 18.1 weight percent binder particles, and approximately 17.9 weight percent light scattering particles. For the two-part solvent of water and ethanol, a suitable formulation is approximately 51.7 weight percent water, approximately 17.2 weight percent ethanol, approximately 17.3 weight percent binder particles, and approximately 13.8 weight percent light scattering particles. The formulation using ethanol (as opposed to methanol) reduces the paint's toxicity and is not corrosive to underlying structures made from aluminum alloys and stainless steel.

Figure 2:
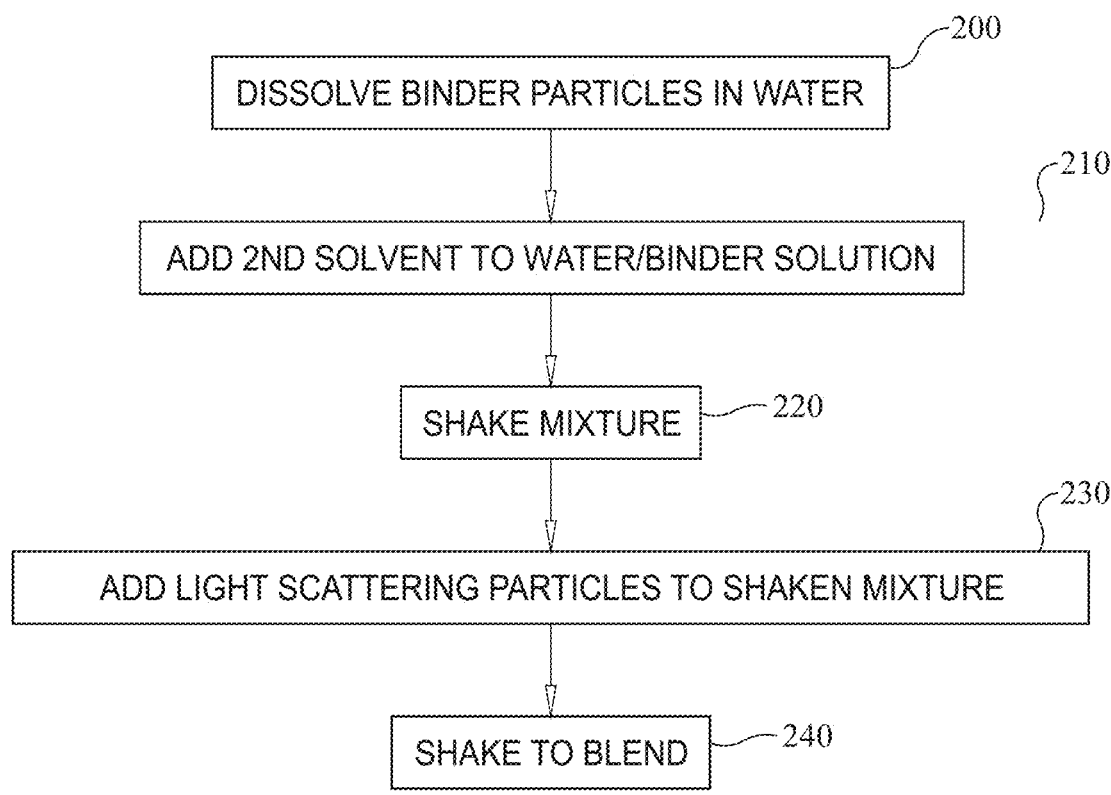
FIG. 2 is a process flow diagram for fabricating a reflective paint in accordance with another embodiment of the present invention.

The process used to fabricate the above described reflective paint formulations will now be described with reference to FIGS. 1 and 2. In FIG. 1, the process steps for fabrication of the paint formulation using only water as the solvent are illustrated. In FIG. 2, the process steps for fabrication of the paint formulation using a two-part solvent are illustrated. Both fabrication processes are carried out at room temperature (i.e., approximately 20° C.) and at a relative humidity of approximately 50%.

Referring first to FIG. 1, the reflective paint fabrication process begins at step 100 where the appropriate weight percent of water and binder particles are mixed to achieve complete dissolution of the binder particles in the water. Following step 100, the appropriate weight percent of light scattering particles are added to the water/binder solution at step 110. The resulting mixture of the water/binder solution and light scattering particles are then blended together by a shaking operation at step 120 where the shaking process is similar to that performed by a paint-shaking apparatus. Typically, shaking for at least 1 minute is required. Prior to use of the reflective paint, shaking step 120 is repeated.

Referring next to FIG. 2, the reflective paint fabrication process begins at step 200 where the appropriate weight percent of water and binder particles are mixed to achieve complete dissolution of the binder particles in the water. Following step 200, the appropriate weight percent of the second solvent (i.e., either methanol or ethanol) is added at step 210 to the water/binder solution. The resulting mixture from step 210 is then shaken at step 220 for at least 1 minute to ensure that the binder particles do not precipitate from the mixture. Next, at step 230, the light scattering particles are added to the shaken mixture from step 220. The resulting mixture from step 230 is blended by a shaking operation at step 240 that typically lasts for at least 1 minute. Prior to use of this embodiment of the reflective paint, shaking step 240 is repeated.

Figure 3:
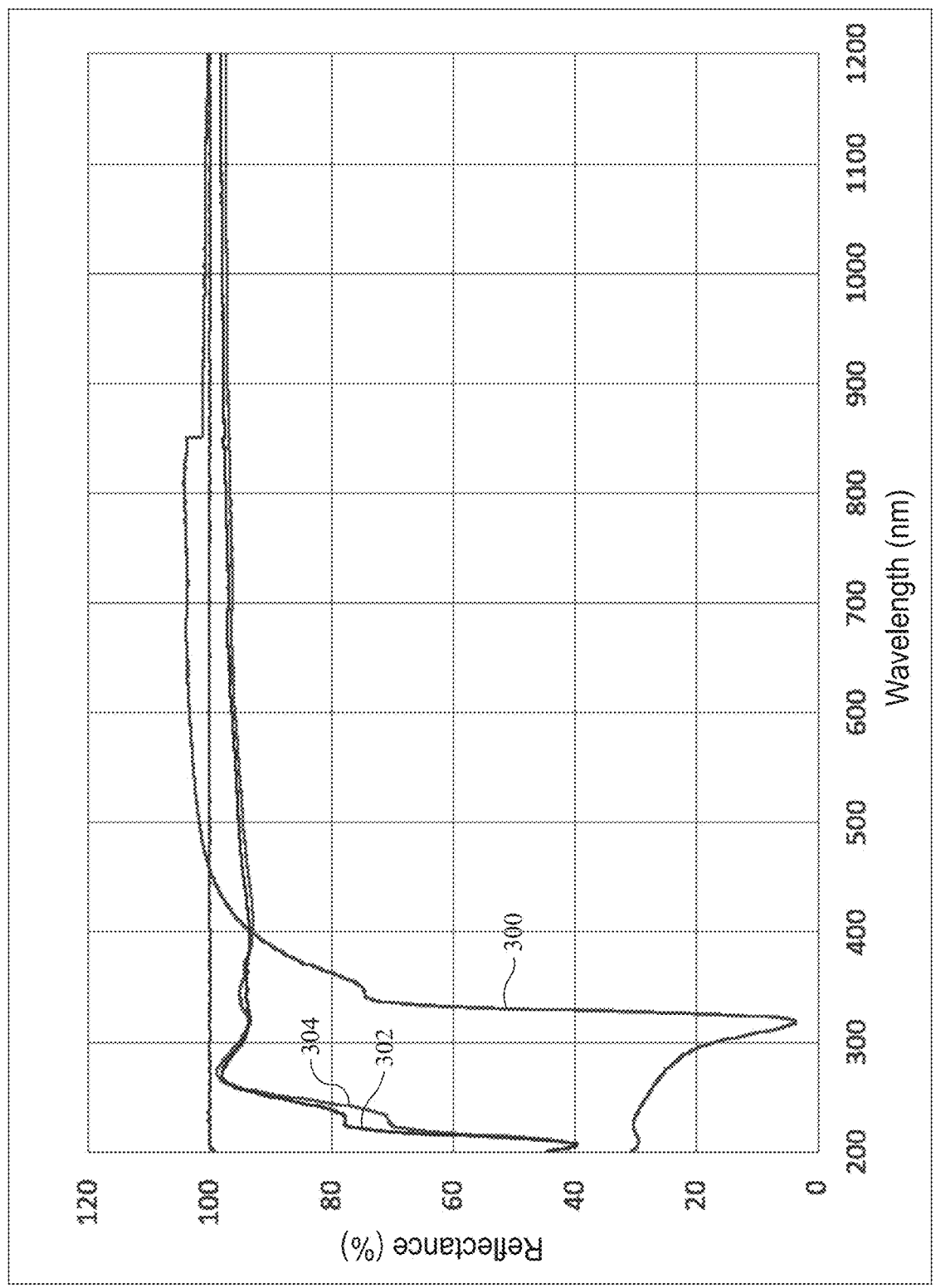
FIG. 3 is a graph of reflectance spectra versus wavelength for a silver-coated polyimide film prior to and after being painted with a reflective paint formulated in accordance with an embodiment of the present invention.
Figure 4:
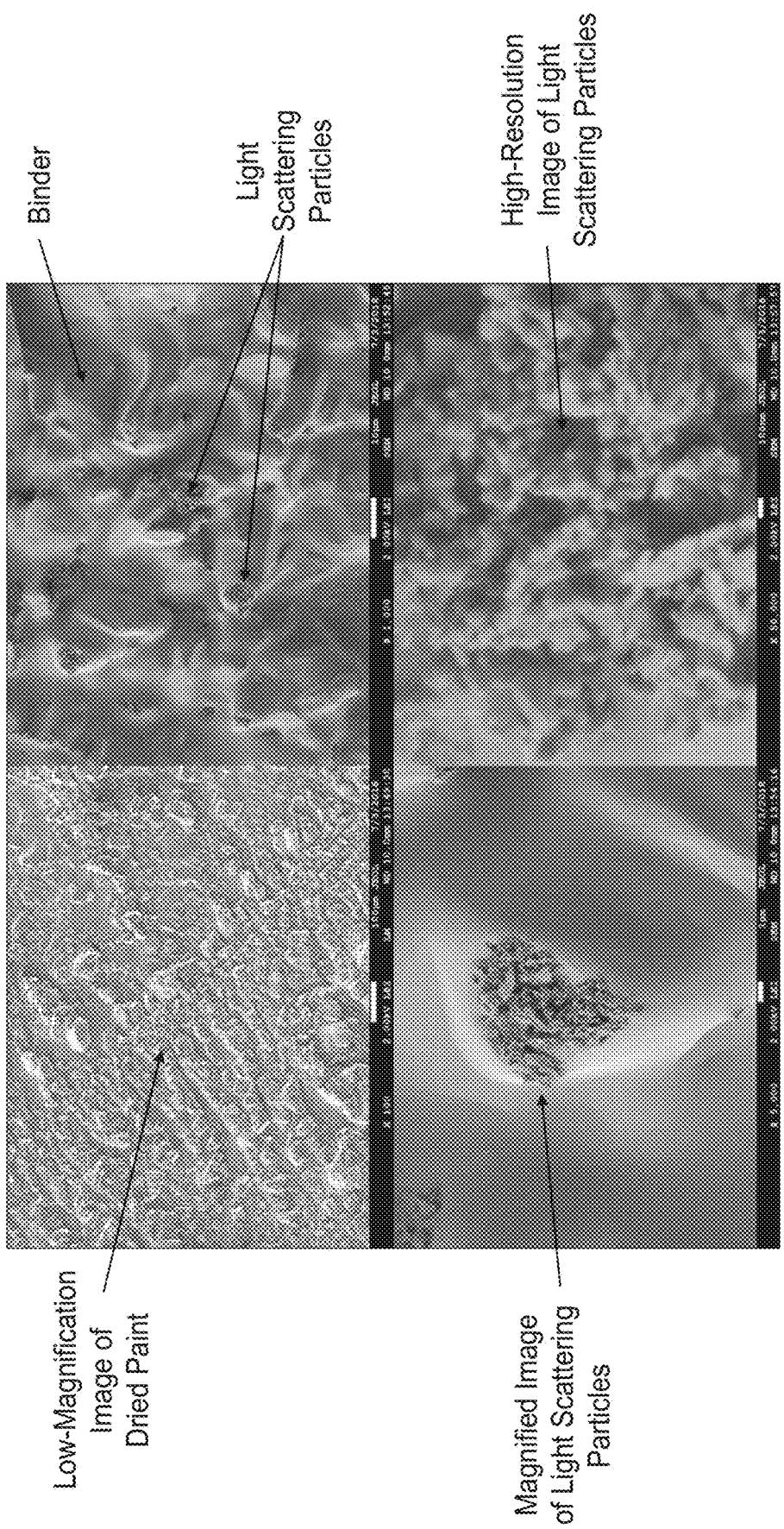
FIG. 4 is a series of a scanning electron microscope (SEM) images of varying magnification illustrating features of a dried painted surface resulting when a reflective paint formulated in accordance with an embodiment of the present invention has dried to capture the light scattering particles in place.

The effectiveness of the reflective paint described herein will now be illustrated with reference to FIGS. 3-5. FIG. 3 is a graph of reflectance percentage as a function of wavelength for a silver-coated polyimide film (e.g., KAPTON) where a reflectance curve 300 was generated for a piece of the film not painted by the present invention's reflective paint. Reflectance curves 302 and 304 were generated by a piece of film that was painted (e.g., via spray painting) with the reflective paint of the present invention. For these samples, the reflective paint formulation was the above-noted two-part solvent of water and methanol-based paint having approximately 48.0 weight percent water, approximately 16.0 weight percent methanol, approximately 18.1 weight percent potassium bromide, and approximately 17.9 weight percent yttrium oxide particles. The difference between reflectance curve 300 and curves 302/304 illustrate that the reflectivity in the ultraviolet range has increased substantially after application of the paint and that the silver reflects the longer wave radiation that went through the paint.

The reflective properties of the present invention's paint will now be explained with reference to FIG. 4 where a series of scanning electron microscope (SEM) images of varying magnification of a dried painted surface are illustrated. After the reflective paint is applied to a surface, the paint is allowed to dry. During the drying process, the paint's solvent(s) evaporate thereby allowing the binder to come out of solution whereby the binder forms a solid connected mass on the painted structure's surface. The solid binder mass holds the light scattering particles in fixed position on and in the solid binder. That is, the light scattering particles retain their particle nature in fixed positions on and in the binder mass. To more clearly see the above-described features, reference is made to FIG. 4. In the upper left image, a low-magnification (e.g., 100×) SEM image shows the dried paint on a substrate surface (not visible). The upper right image (magnified 1000×) in FIG. 4 illustrates the solid mass of binder supporting and fixing light scattering particles. The lower left image (magnified 5000×) in FIG. 4 illustrates a magnified image of a single light scattering particle, and the lower right image (magnified 50,000×) of FIG. 4 illustrates an even higher magnification of the light scattering particle. For this sample, the reflective paint formulation was the water-only solvent paint with approximately 60.8 weight percent water, approximately 19.7 weight percent potassium bromide, and approximately 19.5 weight percent yttrium oxide particles.

Figure 5:
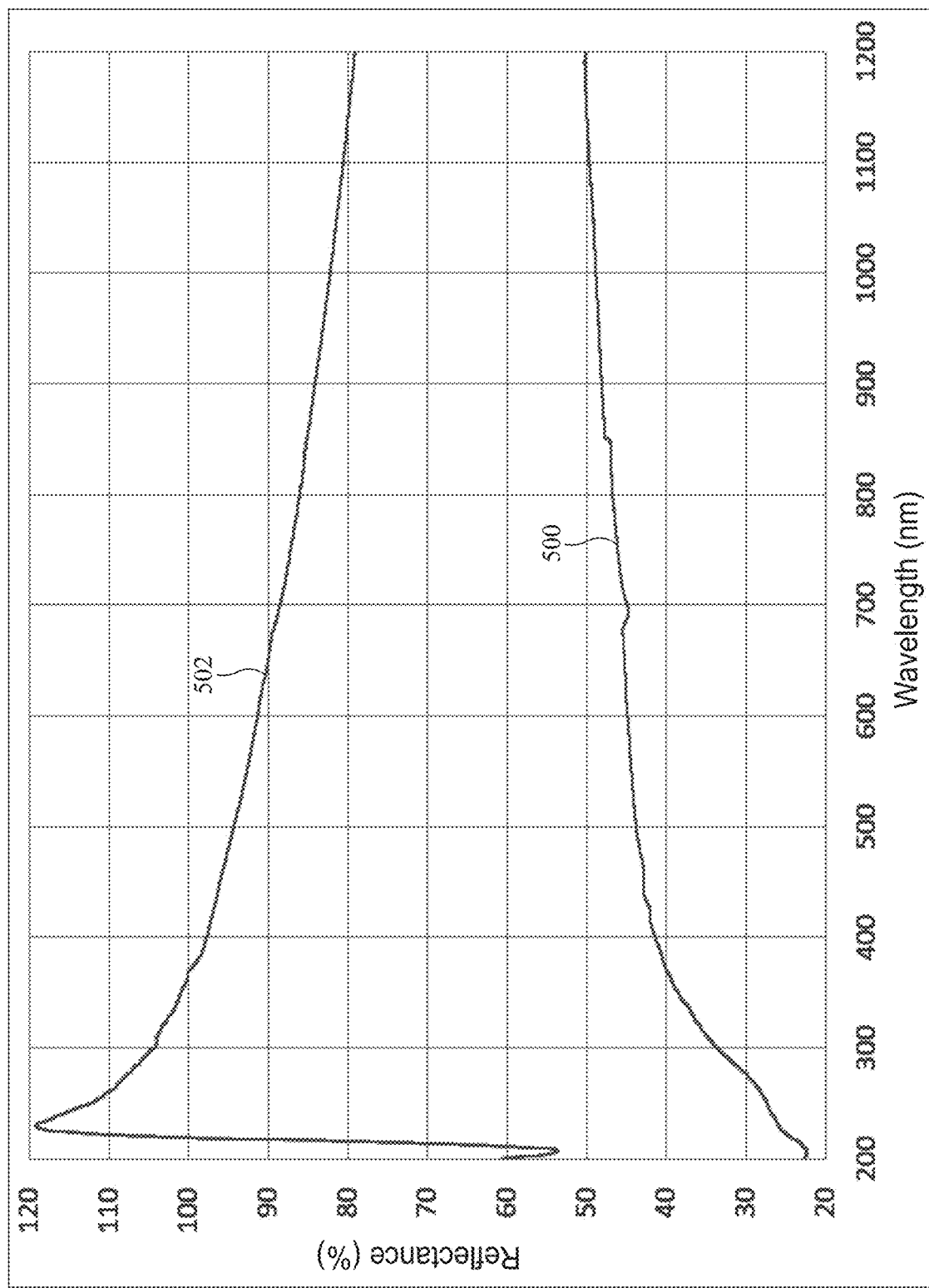
FIG. 5 is a graph of reflectance spectra versus wavelength for a piece of stainless steel prior to and after being painted with a reflective paint formulated in accordance with an embodiment of the present invention.

FIG. 5 is a graph of reflectance percentage as a function of wavelength for a piece of stainless steel where a reflectance curve 500 was generated using the unpainted piece of stainless steel and a reflectance curve 502 was generated by the piece of steel after being painted (e.g., via spray painting) with the reflective paint of the present invention. For the painted sample, the reflective paint formulation was the two-part solvent of water and methanol-based paint with approximately 48.0 weight percent water, approximately 16.0 weight percent methanol, approximately 18.1 weight percent potassium bromide, and approximately 17.9 weight percent yttrium oxide particles. The difference between reflectance curves 500 and 502 illustrate that there is a dramatic improvement in the reflectivity of the stainless steel piece after application of the paint.

The advantages of the present invention are numerous. The reflective paint greatly increases a structure's reflectance characteristics. The paint nature of the present invention will allow it to be readily used for a variety of structures and systems. The paint formulations are simple and easy to fabricate thereby making them cost-effective solutions in the field of reflective coatings.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A reflective paint, comprising a liquid mixture that includes:
   42.4-71.3 weight percent of a liquid solvent,
   14.4-28.3 weight percent of a binder fully dissolved in said liquid solvent, said binder being selected from the group of materials consisting of potassium bromide, sodium chloride, potassium chloride, sodium bromide, cesium chloride, and rubidium chloride, and
   13.8-29.3 weight percent of light scattering particles that are insoluble in said liquid solvent and are of a size ranging from 100 nanometers to 200 nanometers, said light scattering particles selected from the group of materials consisting of hafnium oxide and yttrium oxide.

2. The reflective paint as in claim 1, wherein said liquid solvent includes purified water.

3. The reflective paint as in claim 2, wherein said liquid solvent comprises 44.1-51.7 weight percent of said purified water and 14.7-17.2 weight percent of a liquid selected from the group consisting of ethanol and methanol.

4. The reflective paint as in claim 3, wherein said liquid mixture comprises 48.0 weight percent of said purified water, 16.0 weight percent of said liquid consisting of the methanol, 18.1 weight percent of said binder, and 17.9 weight percent of said light scattering particles.

5. The reflective paint as in claim 4, wherein said binder comprises the potassium bromide and said light scattering particles comprises the yttrium oxide.

6. The reflective paint as in claim 3, wherein said liquid mixture comprises 51.7 weight percent of said purified water, 17.2 weight percent of said liquid consisting of the ethanol, 17.3 weight percent of said binder, and 13.8 weight percent of said light scattering particles.

7. The reflective paint as in claim 6, wherein said binder comprises the potassium bromide and said light scattering particles comprise the yttrium oxide.

8. The reflective paint as in claim 2, wherein said liquid mixture comprises 60.8 weight percent of said purified water, 19.7 weight percent of said binder, and 19.5 weight percent of said light scattering particles.

9. The reflective paint as in claim 2, wherein said purified water has an ionic purity of at least 18.2 megohms.

10. The reflective paint as in claim 1, wherein said binder has a purity of at least 99.9 percent.

11. The reflective paint as in claim 1, wherein said light scattering particles have a purity of at least 99.9 percent.

12. A reflective paint, comprising a liquid mixture that includes:
   42.4-71.3 weight percent purified water,
   14.4-28.3 weight percent of a binder having a material purity of at least 99.9 percent, said binder comprising a single material selected from the group consisting of potassium bromide, sodium chloride, potassium chloride, sodium bromide, cesium chloride, and rubidium chloride, and
   13.8-29.3 weight percent of light scattering particles having a material purity of at least 99.9 percent, said light scattering particles having a size ranging from 100 nanometers to 200 nanometers, said light scattering particles comprising a single material selected from the group consisting of hafnium oxide and yttrium oxide.

13. The reflective paint as in claim 12, wherein said liquid mixture further includes 14.7-17.2 weight percent of a liquid solvent having a purity of at least 99.9 percent, said liquid solvent being one of ethanol and methanol.

14. The reflective paint as in claim 13, wherein said liquid mixture comprises 48.0 weight percent of said purified water, 16.0 weight percent of said liquid solvent consisting of the methanol, 18.1 weight percent of said binder, and 17.9 weight percent of said light scattering particles.

15. The reflective paint as in claim 14, wherein said binder comprises the potassium bromide and said light scattering particles comprises the yttrium oxide.

16. The reflective paint as in claim 13, wherein said liquid mixture comprises 51.7 weight percent of said purified water, 17.2 weight percent of said liquid solvent consisting of the ethanol, 17.3 weight percent of said binder, and 13.8 weight percent of said light scattering particles.

17. The reflective paint as in claim 16, wherein said binder comprises the potassium bromide and said light scattering particles comprises the yttrium oxide.

18. The reflective paint as in claim 12, wherein said liquid mixture comprises 60.8 weight percent of said purified water, 19.7 weight percent of said binder, and 19.5 weight percent of said light scattering particles.

19. The reflective paint as in claim 12, wherein said purified water has an ionic purity of at least 18.2 megohms.

20. A reflective paint, comprising a liquid mixture that includes:
   42.4-71.3 weight percent purified water,
   14.4-28.3 weight percent of potassium bromide having a material purity of at least 99.9 percent, and
   13.8-29.3 weight percent of yttrium oxide particles having a material purity of at least 99.9 percent, said yttrium oxide particles having a size ranging from 100 nanometers to 200 nanometers.

* * * * *